US012073772B2

(12) United States Patent
Zheng et al.

(10) Patent No.: US 12,073,772 B2
(45) Date of Patent: Aug. 27, 2024

(54) ARRAY SUBSTRATE, DRIVING METHOD THEREOF, AND DISPLAY APPARATUS

(71) Applicant: BOE Technology Group Co., Ltd., Beijing (CN)

(72) Inventors: Haoliang Zheng, Beijing (CN); Minghua Xuan, Beijing (CN); Dongni Liu, Beijing (CN); SeungWoo Han, Beijing (CN); Li Xiao, Beijing (CN); Liang Chen, Beijing (CN); Hao Chen, Beijing (CN); Jiao Zhao, Beijing (CN); Qi Qi, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 87 days.

(21) Appl. No.: 17/511,335

(22) Filed: Oct. 26, 2021

(65) Prior Publication Data

US 2022/0293037 A1 Sep. 15, 2022

(30) Foreign Application Priority Data

Mar. 15, 2021 (CN) ......................... 202110274889.2

(51) Int. Cl.
*G09G 3/32* (2016.01)

(52) U.S. Cl.
CPC ....... *G09G 3/32* (2013.01); *G09G 2300/0452* (2013.01); *G09G 2310/0275* (2013.01); *G09G 2310/0297* (2013.01)

(58) Field of Classification Search
CPC ............. G09G 3/32; G09G 2300/0452; G09G 2310/0275; G09G 2310/0297
(Continued)

(56) References Cited

U.S. PATENT DOCUMENTS 6,448,718 B1 * 9/2002 Battersby ............. G09G 3/3291 345/82
9,245,475 B2 * 1/2016 Lin ...................... G09G 3/2096
(Continued)

FOREIGN PATENT DOCUMENTS

CN 105930827 A 9/2016
CN 106526996 A * 3/2017
(Continued)

OTHER PUBLICATIONS

Foreign Document and Translation of CN-106526996A (Year: 2017).*
CN202110274889.2 first office action.

*Primary Examiner* — Jason M Mandeville
(74) *Attorney, Agent, or Firm* — IPro, PLLC

(57) ABSTRACT

Disclosed is an array substrate including multiple first selection circuits with each including at least two first selection transistors and at least two first anticreeping transistors. Each first selection transistor is connected with one first anticreeping transistor in series. When the first selection transistor is turned on by a first turn-on signal from a first control signal terminal, the first anticreeping transistor is turned on by a second turn-on signal from a second control signal terminal. When the first selection transistor is turned off by a first turn-off signal from the first control signal terminal, the first anticreeping transistor is turned off to make the first selection transistors and the data signal terminal disconnected, by a second turn-off signal from the second control signal terminal. A voltage of the first turn-off signal is greater than a voltage of the second turn-off signal.

18 Claims, 8 Drawing Sheets

(58) Field of Classification Search
USPC ........................................................... 345/55
See application file for complete search history.

(56) References Cited

U.S. PATENT DOCUMENTS

| | | | | |
|---|---|---|---|---|
| 10,541,286 | B2 * | 1/2020 | Park | H10K 59/123 |
| 10,885,867 | B2 * | 1/2021 | Wu | G09G 3/3677 |
| 2007/0057877 | A1 * | 3/2007 | Choi | G09G 3/3291 345/76 |
| 2011/0170031 | A1 * | 7/2011 | Son | H01L 27/124 349/46 |
| 2015/0213753 | A1 * | 7/2015 | Lin | G09G 3/3275 345/214 |
| 2020/0043394 | A1 | 2/2020 | Bai et al. | |
| 2020/0160767 | A1 | 5/2020 | Mi et al. | |

FOREIGN PATENT DOCUMENTS

| | | | |
|---|---|---|---|
| CN | 106526996 | A | 3/2017 |
| CN | 106782269 | A | 5/2017 |
| CN | 107167973 | A | 9/2017 |
| CN | 107481659 | A | 12/2017 |
| CN | 108594553 | A | 9/2018 |
| CN | 108962120 | A | 12/2018 |
| CN | 109188812 | A | 1/2019 |
| CN | 110246444 | A | 9/2019 |
| CN | 210805780 | U | 6/2020 |

* cited by examiner

--Prior Art--

ARRAY SUBSTRATE, DRIVING METHOD THEREOF, AND DISPLAY APPARATUS

CROSS REFERENCE TO RELATED APPLICATIONS

This disclosure is based on and claims priority under 35 U.S.C 119 to Chinese Patent Application No. 202110274889.2, filed on Mar. 15, 2021, in the China National Intellectual Property Administration. The entire disclosure of the above application is incorporated herein by reference.

FIELD

The disclosure relates to the technical field of display, in particular to an array substrate, a driving method thereof, and a display apparatus.

BACKGROUND

With constant development of a display technology, a light emitting diode (LED) with characteristics of high brightness, low power consumption, long life and the like has become commonly used in the display industry.

In an LED display, a drive chip outputs data signals to the LED through data lines. The LED display has many data lines, accordingly, the data drive chip needs more data signal terminals, thus more data transmission lines are required for transmitting the data signal to each data line, which is not conductive to realizing a narrow bezel of the display.

SUMMARY

For at least this purpose, embodiments of the disclosure provide an array substrate and a display apparatus.

An array substrate according to some embodiments of the disclosure, includes: a plurality of first selection circuits, wherein each first selection circuit comprises at least two first selection transistors and at least two first anticreeping transistors, and each first selection transistor is correspondingly connected with one first anticreeping transistor of the at least two first anticreeping transistors in series. For each first selection transistor and the one first anticreeping transistor connected in series: when the first selection transistor is turned on under control of a first turn-on signal provided by a first control signal terminal, the first anticreeping transistor is turned on under control of a second turn-on signal provided by a second control signal terminal to form a conducting path between a data signal terminal and the first selection transistor; and when the first selection transistor is turned off under control of a first turn-off signal provided by the first control signal terminal, the first anticreeping transistor is turned off under control of a second turn-off signal provided by the second control signal terminal to make the first selection transistor and the data signal terminal disconnected, wherein a voltage of the first turn-off signal is greater than a voltage of the second turn-off signal.

Embodiments of the disclosure further provide a display apparatus, including an array substrate. The array substrate includes: a plurality of first selection circuits, wherein each first selection circuit comprises at least two first selection transistors and at least two first anticreeping transistors, and each first selection transistor is correspondingly connected with one first anticreeping transistor of the at least two first anticreeping transistors in series. For each first selection transistor and the one first anticreeping transistor connected in series: when the first selection transistor is turned on under control of a first turn-on signal provided by a first control signal terminal, the first anticreeping transistor is turned on under control of a second turn-on signal provided by a second control signal terminal to form a conducting path between a data signal terminal and the first selection transistor; and when the first selection transistor is turned off under control of a first turn-off signal provided by the first control signal terminal, the first anticreeping transistor is turned off under control of a second turn-off signal provided by the second control signal terminal to make the first selection transistor and the data signal terminal disconnected, wherein a voltage of the first turn-off signal is greater than a voltage of the second turn-off signal.

Embodiments of the disclosure further provide a driving method of the above array substrate, including: turning on, in a time-sharing mode, each pair of first selection transistor and first anticreeping transistor connected in series and included in each first selection circuit. At a turn-on stage, the first selection transistor is turned on in response to the first turn-on signal provided by the first control signal terminal, and the first anticreeping transistor is turned on in response to the second turn-on signal provided by the second control signal terminal, to make a conducting path between the data signal terminal and the first selection transistor. At a turn-off stage, the first selection transistor is in a turn-off state in response to the first turn-off signal provided by the first control signal terminal, and the first anticreeping transistor is turned off in response to the second turn-off signal provided by the second control signal terminal, to make the data signal terminal and the first selection transistor disconnected.

DETAILED DESCRIPTION OF THE EMBODIMENTS

In order to make the objective, technical solutions and advantages of the embodiments of the disclosure more clear, the technical solutions of the embodiments of the disclosure will be described clearly and completely with reference to the drawings of the embodiments of the disclosure. Obviously, the described embodiments are part of the embodiments of the disclosure, but not all the embodiments. On the basis of the described embodiments of the disclosure, all other embodiments obtained by those ordinarily skilled in the art without inventive efforts fall within the protection scope of the disclosure.

Unless otherwise defined, the technical or scientific terms used here shall have the usual meanings understood by those ordinarily skilled in the art to which the disclosure belongs. The words "first", "second" and the like used in the specification and claims of the disclosure do not indicate any order, quantity or importance, but are only configured to distinguish different components. The word "including" or "comprising" and the like, means that an element or item preceding the word covers an element or item listed after the word and the equivalent thereof, without excluding other elements or items.

Figure 1:
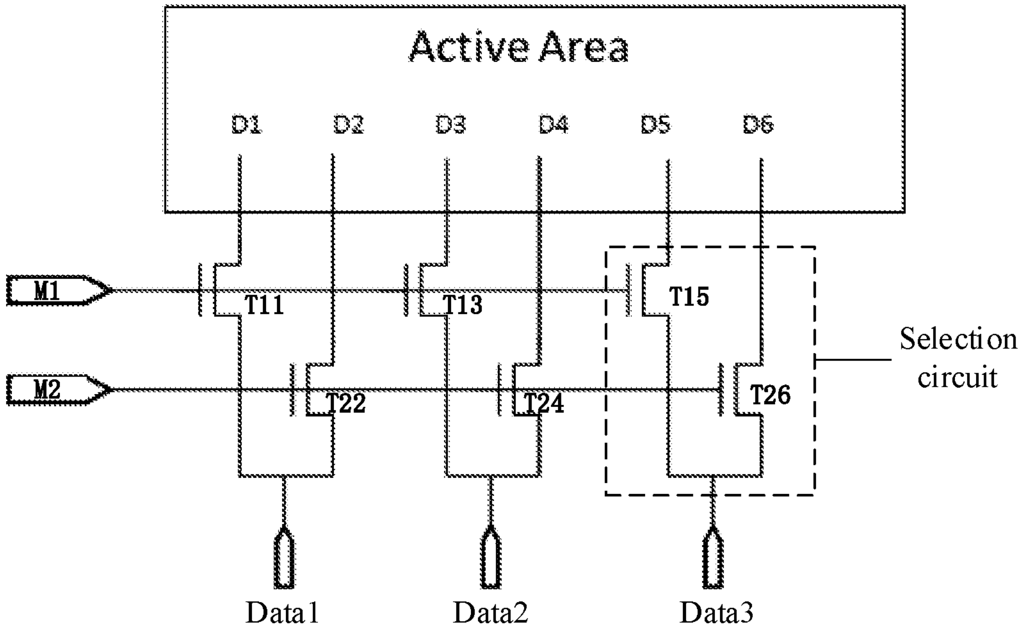
FIG. 1 is a schematic structural diagram of an array substrate in the related art.

In order to realize a full screen and reduce the quantity of data transmission lines, a selection circuit is disposed between data signal terminals (such as Data1, Data2 and Data3) included in a source drive chip and a data line in the related art, as shown in FIG. 1. During specific implementation, under control of an output end (such as M1 and M2) of a gate drive chip, two selection transistors (such as T11 and T22, T13 and T24, as well as T15 and T26) coupled to each data signal terminal (such as Data1, Data2 and Data3) work in a time-sharing mode. However, inventors find that after M1 provides a voltage of −13V to turn on T11 so as to provide a voltage of −7V of Data1 to a first column of sub pixels D1, M1 provides a voltage of 13V to turn off T11, M2 provides a voltage of −13V, T22 is turned on so as to provide a voltage of −3V of Data1 to a second column of sub pixels D2, at this moment, a difference Vgs between a gate voltage and a source voltage of T11 is 13V−3V=10V, resulting in a leakage current of about $100*10^{-12}$ A of T11. The voltage of −7V provided for the first column of sub pixels D1 will be pulled up due to the large leakage current of T11, the original voltage of −7V cannot be kept, and normal display is affected.

Figure 2:
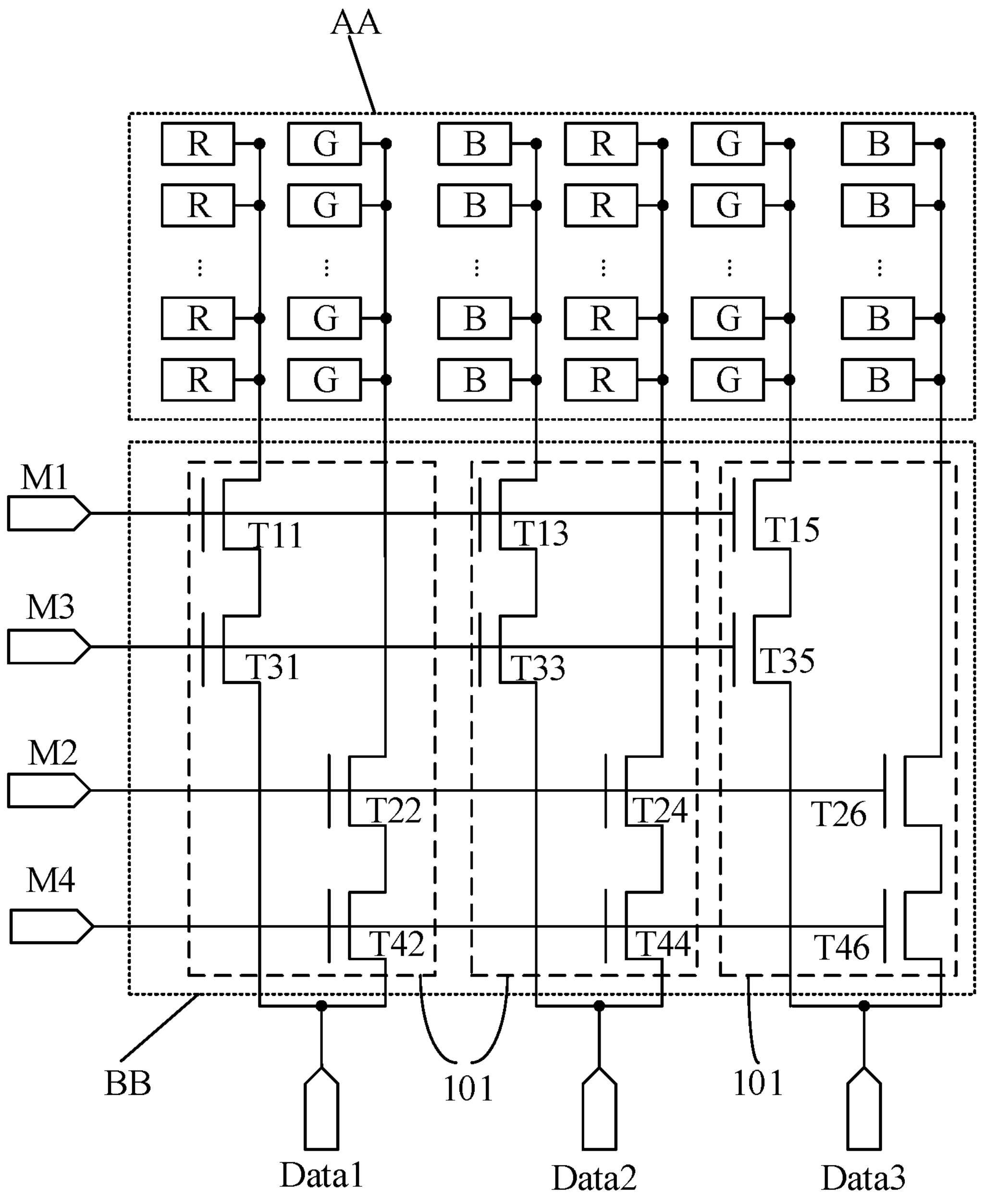
FIG. 2 is a schematic structural diagram of an array substrate according to some embodiments of the disclosure.

In order to at least solve the above technical problem existing in the related art, an array substrate according to some embodiments of the disclosure, as shown in FIG. 2, includes:

a plurality of first selection circuits 101, wherein each first selection circuit 101 includes at least two first selection transistors (such as T11 and T22, T13 and T24, as well as T15 and T26) and at least two first anticreeping transistors (such as T31 and T42, T33 and T44, as well as T35 and T46), and each first selection transistor (such as T11) is correspondingly connected with one first anticreeping transistor (such as T31) in series;

for a group of the first selection transistor (such as T11) and the first anticreeping transistor (such as T31) connected in series, when the first selection transistor (such as T11) is turned on under control of a first turn-on signal provided by a first control signal terminal (such as M1), the first anticreeping transistor (such as T31) is turned on under control of a second turn-on signal provided by a second control signal terminal (such as M3) to form a conducting path between a data signal terminal (such as Data1) and the first selection transistor (such as T11); and when the first selection transistor (such as T11) is turned off under control of a first turn-off signal provided by the first control signal terminal (such as M1), the first anticreeping transistor (such as T31) is turned off under control of a second turn-off signal provided by the second control signal terminal (such as M3) to make the first selection transistors (such as T11) and the data signal terminal (such as Data1) disconnected, wherein a voltage of the first turn-off signal is greater than a voltage of the second turn-off signal.

In the above array substrate provided by the embodiments of the disclosure, the first turn-off signal provided by the first control signal terminal (such as M1) is greater than the second turn-off signal provided by the second control signal terminal (such as M3), therefore, when a voltage of the first electrode of the first selection transistor (such as T11) and a voltage of the first electrode of the first anticreeping transistor (such as T31) are both a voltage of the data signal terminal (such as Data1), a difference between a gate voltage of the first anticreeping transistor (such as T31) and the voltage of the data signal terminal (such as Data1) is smaller than a difference between a gate voltage of the first selection transistor (such as T11) and the data signal terminal (such as Data1). That is, the difference between the gate voltage of the first anticreeping transistor (such as T31) and the voltage of the data signal terminal (such as Data1) may be small so that the first anticreeping transistor (such as T31) may be turned off. Because the first selection transistor (such as T11) and the first anticreeping transistor (such as T31) are connected in series, the first selection transistor (such as T11) are disconnected from the data signal terminal (such as Data1) at the first anticreeping transistor (such as T31), so as to effectively avoid influence of the data signal terminal (such as Data1) on the first selection transistor (such as T11) in a turn-off state, effectively solve the problem of electric leakage of the first selection transistors (such as T11), and ensure normal display.

In addition, due to the first selection transistor (such as T11) and the first anticreeping transistor (such as T31) being connected in series, a data signal of the data signal terminal (such as Data1) may be provided to one column of sub pixels under control of the first turn-on signal provided by the first control signal terminal (such as M1) and the second turn-on signal provided by the second control signal terminal (such as M3), and thus the first anticreeping transistor (such as T31) do not affect normal work of the first selection transistor (such as T11). In some embodiments, a voltage of the first turn-on signal may be equal to a voltage of the second turn-on signal.

In some embodiments, the above array substrate provided by the embodiments of the disclosure, as shown in FIG. 2, includes a plurality of pixels arranged in an array. Each pixel may include but is not limited to a red sub pixel R, a green sub pixel G and a blue sub pixel B. All the sub pixels may be light emitting diodes such as a micro light emitting diode (Micro-LED) and a mini light emitting diode (Mini-LED).

The first control signal terminal may include a first sub signal terminal M1 and a second sub signal terminal M2, and the second control signal terminal includes a third sub signal terminal M3 and a fourth sub signal terminal M4.

The data signal terminal may include a plurality of sub data signal terminals (such as Data1, Data2 and Data3), and each sub data signal terminal is correspondingly coupled with one first selection circuit 101.

Each first selection circuit 101 includes: a first transistor (such as T11, T13 and T15), a second transistor (such as T22, T24 and T26), a third transistor (such as T31, T33 and T35) and a fourth transistor (such as T42, T44 and T46).

The first transistors (such as T11, T13 and T15) and the second transistors (such as T22, T24 and T26) are the first selection transistors, and the third transistors (such as T31, T33 and T35) and the fourth transistors (such as T42, T44 and T46) are the first anticreeping transistors.

Gate electrodes of the first transistors (such as T11, T13 and T15) are coupled with the first sub signal terminal M1, first electrodes of the first transistors (such as T11, T13 and T15) are coupled with second electrodes of the third transistors (such as T31, T33 and T35), and second electrodes of the first transistors (such as T11, T13 and T15) are coupled with an odd-number column of sub pixels.

Gate electrodes of the third transistors (such as T31, T33 and T35) are coupled with the third sub signal terminal M3, and first electrodes of the third transistors (such as T31, T33 and T35) are coupled with the corresponding sub data signal terminals (such as Data1, Data2 and Data3).

Gate electrodes of the second transistors (such as T22, T24 and T26) are coupled with the second sub signal terminal M2, first electrodes of the second transistors (such as T22, T24 and T26) are coupled with second electrodes of the fourth transistors (such as T42, T44 and T46), and second electrodes of the second transistors (such as T22, T24 and T26) are coupled with an even-number column of sub pixels.

Gate electrodes of the fourth transistors (such as T42, T44 and T46) are coupled with the fourth sub signal terminal M4, and first electrodes of the fourth transistors (such as T42, T44 and T46) are coupled with the corresponding sub data signal terminals (such as Data1, Data2 and Data3).

During specific implementation, when the first sub signal terminal M1 controls the first transistors (such as T11, T13 and T15) to be turned on, the third transistors (such as T31, T33 and T35) are turned on under control of the third sub signal terminal M3, so that data signals of the sub data signal terminals (such as Data1, Data2 and Data3) are provided to the odd-number columns of the sub pixels via the third transistors (such as T31, T33 and T35) and the first transistors (such as T11, T13 and T15). At the same time, the second sub signal terminal M2 controls the second transistors (such as T22, T24 and T26) to be turned off, the fourth transistors (such as T42, T44 and T46) are turned off under control of the fourth sub signal terminal M4, so that the sub data signal terminals (such as Data1, Data2 and Data3) and the second transistors (such as T22, T24 and T26) are disconnected, the data signals of the data signal terminals (such as Data1, Data2 and Data3) are prevented from being provided to the second transistors (such as T22, T24 and T26), and the second transistors (such as T22, T24 and T26) are prevented from being subjected to electric leakage to affect a potential of the odd-number columns of sub pixels.

When the second sub signal terminal M2 controls the second transistors (such as T22, T24 and T26) to be turned on, the fourth transistors (such as T42, T44 and T46) are turned on under control of the fourth sub signal terminal M4, so that the data signals of the sub data signal terminals (such as Data1, Data2 and Data3) are provided to the even-number columns of the sub pixels via the fourth transistors (such as T42, T44 and T46) and the second transistors (such as T22, T24 and T26). At the same time, the first sub signal terminal M1 controls the first transistors (such as T11, T13 and T15) to be turned off, the third transistors (such as T31, T33 and T35) are turned off under control of the third sub signal terminal M3, so that the sub data signal terminals (such as Data1, Data2 and Data3) and the first transistors (such as T11, T13 and T15) are disconnected, the data signals of the sub data signal terminals (such as Data1, Data2 and Data3) are prevented from being provided to the first transistors (such as T11, T13 and T15), and the first transistors (such as T11, T13 and T15) are prevented from being subjected to electric leakage to affect a potential of the even-number columns of sub pixels.

It should be noted that the above only illustrates the specific structure of the first selection circuits provided by the embodiment of the disclosure. During specific implementation, the specific structure of the first selection circuits is not limited to the above structure provided by the embodiment of the disclosure, and may further be other structures known by those skilled in the art, which is not limited here.

In some embodiments, in the above array substrate provided by the embodiment of the disclosure, a channel width-to-length ratio of the first selection transistors (such as T11, T13, T15, T22, T24 and T26) may be equal to a channel width-to-length ratio of the first anticreeping transistors (such as T31, T33, T35, T42, T44 and T46). In this way, the same technological parameters may be adopted to manufacture the first selection transistors and the first anticreeping transistors, and a manufacturing technology is simplified. On the other hand, the same channel width-to-length ratio may ensure that during the transistors being turn-on, a current flowing through the first selection transistors (such as T11, T13, T15, T22, T24 and T26) and a current flowing through the first anticreeping transistors (such as T31, T33, T35, T42, T44 and T46) are same in magnitude, thereby ensuring the stability of the current flowing from the data signal terminal (such as Data1, Data2 and Data3) to the sub pixels, so that existence of the first anticreeping transistors (such as T31, T33, T35, T42, T44 and T46) does not affect a charging process of the sub pixels.

In some embodiments, in the above array substrate provided by the embodiment of the disclosure, the first selection transistors (such as T11, T13, T15, T22, T24 and T26) and the first anticreeping transistors (such as T31, T33, T35, T42, T44 and T46) may be N-type low-temperature polycrystalline silicon transistors (LTPS TFT).

When the first selection transistors (such as T11, T13, T15, T22, T24 and T26) are turned off, a difference between the voltage of the first turn-off signal provided by the first control signal terminal (such as M1 and M2) and a voltage of the data signals provided by the data signal terminal (such as Data1, Data2 and Data3) is greater than 3 V, and a difference between the voltage of the second turn-off signal provided by the second control signal terminal (such as M1 and M2) and the voltage of the data signals is greater than 0 V and smaller than or equal to 3 V.

Figure 3:
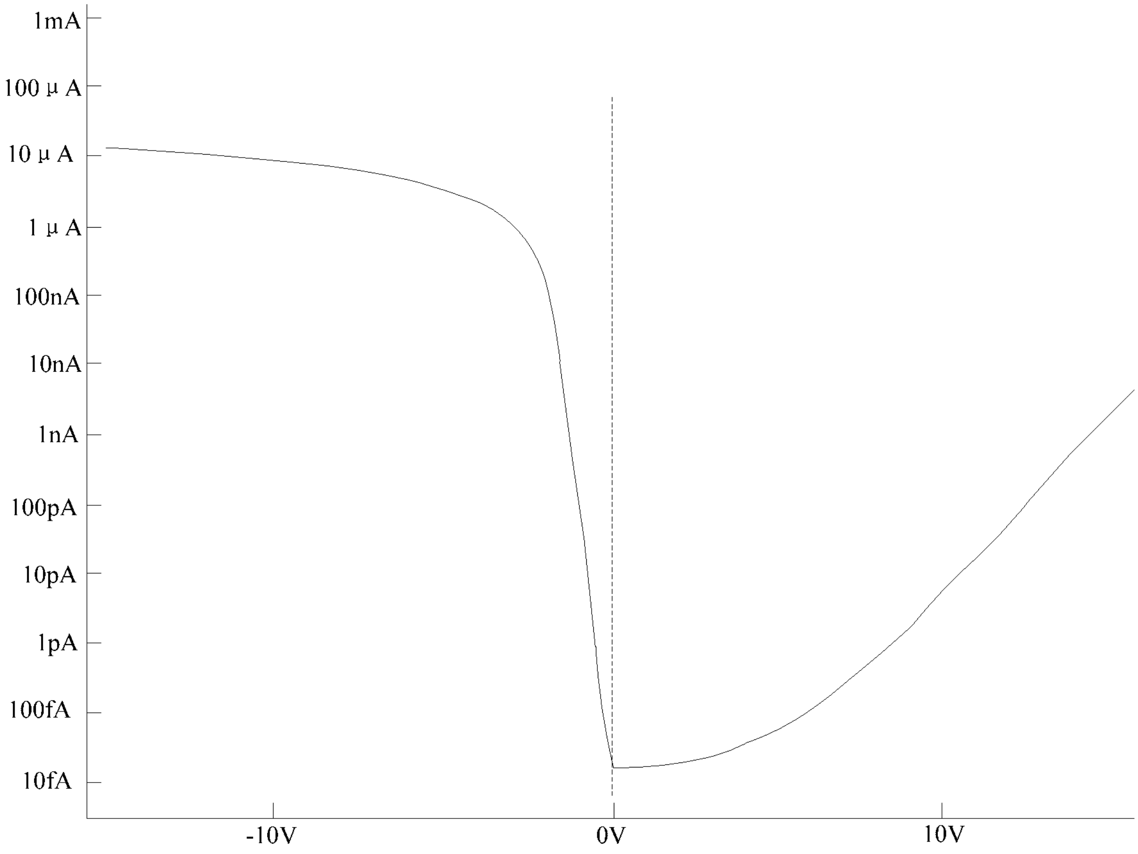
FIG. 3 is a transfer characteristic curve of a low-temperature polycrystalline silicon transistor according to some embodiments of the disclosure.

As shown in FIG. 3, in the disclosure, when a difference Vgs of a gate voltage and a source voltage of the N-type low-temperature polycrystalline silicon transistors is smaller than 0 V, and an absolute value of Vgs is greater than a threshold voltage $V_{th}$ of the N-type low-temperature polycrystalline silicon transistors, the N-type low-temperature polycrystalline silicon transistors are in a turn-on state; when Vgs>0V, the N-type low-temperature polycrystalline silicon transistors are in a turn-off state of a cutoff mode; when 0V<Vgs<3V, a leakage current of the N-type low-temperature polycrystalline silicon transistors is small and may be ignored; but when Vgs>3V, the N-type low-temperature polycrystalline silicon transistors generate a large leakage current, resulting in that the transistors cannot be turned off normally. Therefore, when the difference between the voltage (that is, the gate voltage of the first anticreeping transistors, for example, may be 5 V) of the second control signal terminal (such as M3 and M4) and the voltage (that is, the source voltage of the first anticreeping transistors, for example, may be 3 V) of the data signal terminal (such as Data1, Data2 and Data3) is greater than 0 V and smaller than or equal to 3 V (for example, may be 2 V), it may be ensured that the first anticreeping transistors are turned off, and electric connection between the first selection transistors and the data signal terminal is broken. In this case, even if the difference between the voltage (that is, the gate voltage of the first selection transistors, for example, may be 13 V) of the first control signal terminal (such as M1 and M2) and the voltage of the data signal terminal (such as Data1, Data2 and Data3) is greater than 3 V (for example, may be 10 V), the electric leakage phenomenon of the first selection transistors in the turn-off state may also be avoided due to existence of the first anticreeping transistors.

In some embodiments, a range of the voltage of the data signals provided by the data signal terminal may be 0 V to 8 V or −12 V to 12 V, the voltage of the first turn-on signal and the voltage of the second turn-on signal may be −13 V, the voltage of the first turn-off signal may be 13 V, and the voltage of the second turn-off signal may be 5V. Certainly, during specific implementation, numerical values of the above first turn-on signal, the second turn-on signal, the first turn-off signal and the second turn-off signal may be set according to characteristics of the transistors in actual products and the voltage range of the data signal terminal, it may only be ensured that the leakage current is in the small range (for example, smaller than or equal to $100*10^{-15}$ A), which is not specifically limited here.

Generally, in a cell test stage (Cell Tset), whether all columns of sub pixels work normally is checked through a selection circuit for cell test, and a detection signal at the moment is provided by an external device. However, in an LED display, in order to realize the edge-to-edge design, the selection circuit for cell test needs to be designed in a display region AA and cannot be cut off, that is to say, the selection circuit for cell test still exists in a terminal product. Although in the normal using process of the terminal product, an external detection signal is usually not needed to be provided for the selection circuit for cell test, in consideration that a plurality of selection transistors included in the selection circuit for cell test are connected in parallel, when any selection transistor fails to be normally turned off and electric leakage happens thereto, it may result in the electric leakage risk of other selection transistors to cause abnormal display.

Figure 4:
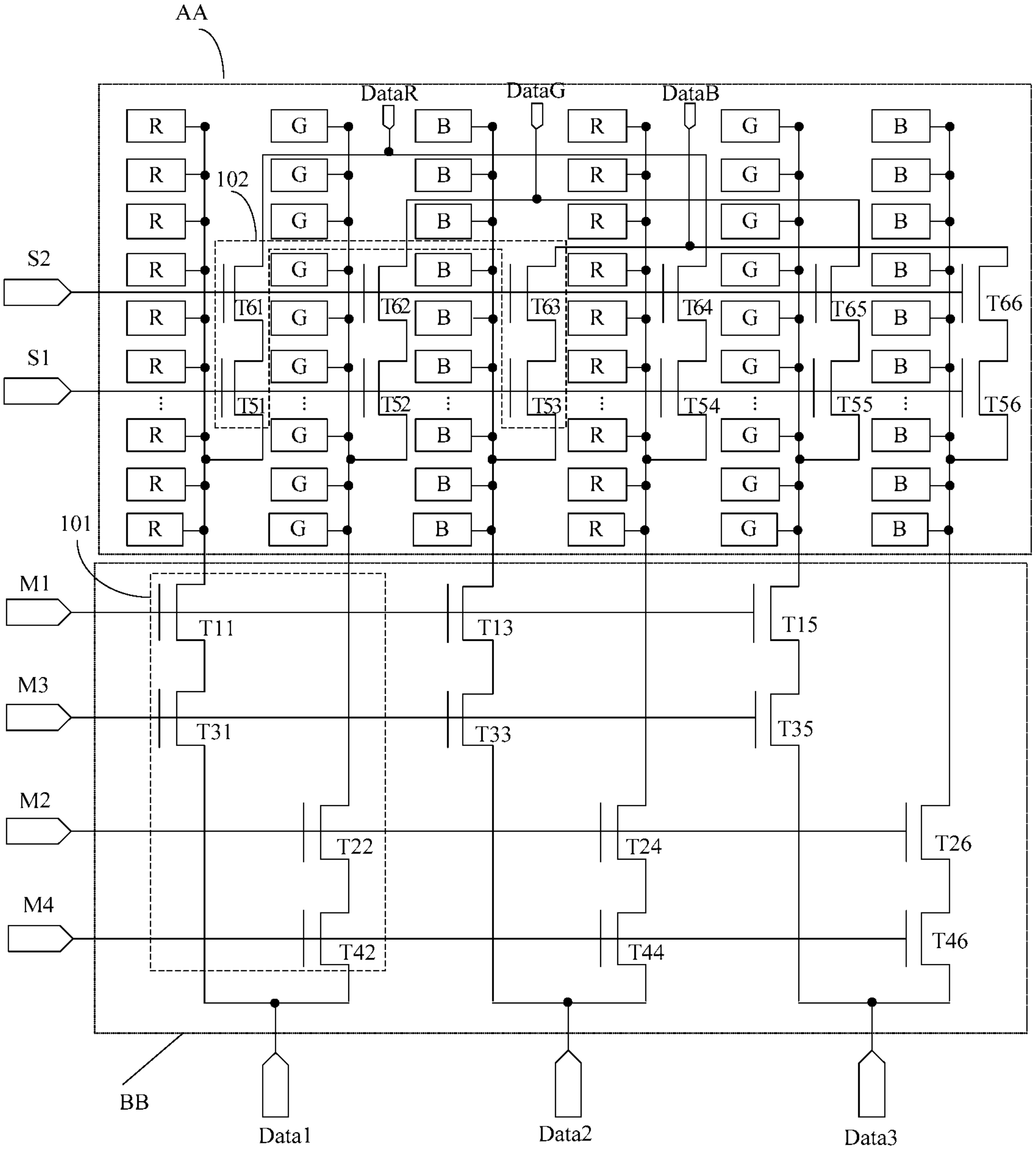
FIG. 4 is another schematic structural diagram of an array substrate according to some embodiments of the disclosure.

Based on this, the above array substrate provided by the embodiment of the disclosure, as shown in FIG. 4, may further include: a plurality of second selection circuits 102 in a display region AA of the array substrate, each second selection circuit 102 may include at least two second selection transistors (such as T51 and T54, T52 and T55, as well as T53 and T56) and at least two second anticreeping transistors (such as T61 and T64, T62 and T65, as well as T63 and T66), and each second selection transistor (such as T51, T54, T52, T55, T53 and T56) is correspondingly connected with one second anticreeping transistor (such as T61, T64, T62, T65, T63 and T66) in series.

When the second selection transistors (such as T51, T54, T52, T55, T53 and T56) are turned off under control of a first turn-off signal provided by a third control signal terminal S1, the second anticreeping transistors (such as T61, T64, T62, T65, T63 and T66) are turned off to make the second selection transistors (such as T51, T54, T52, T55, T53 and T56) and a test signal terminal (such as DataR, DataG and DataB) disconnected under control of a second turn-off signal provided by a fourth control signal terminal S2.

The voltage of the first turn-off signal is greater than the voltage of the second turn-off signal, therefore, when a voltage of first electrodes of the second selection transistors (such as T51, T54, T52, T55, T53 and T56) and a voltage of first electrodes of the second anticreeping transistors (such as T61, T64, T62, T65, T63 and T66) are both a voltage of a third turn-on signal provided by the test signal terminal (such as DataR, DataG and DataB), a difference between a gate voltage of the second anticreeping transistors (such as T61, T64, T62, T65, T63 and T66) and the voltage of the test signal terminal (such as DataR, DataG and DataB) is smaller than a difference between a gate voltage of the second selection transistors (such as T51, T54, T52, T55, T53 and T56) and the voltage of the test signal terminal (such as DataR, DataG, DataB). That is, the difference between the gate voltage of the second anticreeping transistors (such as T61, T64, T62, T65, T63, T66) and the voltage of the test signal terminal (such as DataR, DataG, DataB) may be small, so that the second anticreeping transistors (such as T61, T64, T62, T65, T63 and T66) may be turned off. Because the second selection transistors (such as T51, T54, T52, T55, T53 and T56) and the second anticreeping transistors (such as T61, T64, T62, T65, T63 and T66) are connected in series, the second selection transistors (such as T51, T54, T52, T55, T53 and T56) are disconnected from the test signal terminal (such as DataR, DataG, DataB) at the second anticreeping transistors (such as T61, T64, T62, T65, T63 and T66), so as to solve the problem of electric leakage of the second selection transistors (such as T51, T54, T52, T55, T53 and T56), and ensure normal display.

It should be understood that the magnitude of the voltage of the third turn-on signal provided by the test signal terminal depends on a leakage current of the second selection transistors which cannot be normally turned off.

In addition, it should be noted that in the disclosure, the test signal terminal (such as DataR, DataG and DataB) is configured to charge all the columns of sub pixels at a test stage, so as to detect whether all the columns of sub pixels work normally or not; and the data signal terminal (such as Data1, Data2 and Data3) is configured to charge all the columns of sub pixels in a process that a user uses the terminal product, so as to realize a display function.

In some embodiments, the above array substrate provided by the embodiment of the disclosure, as shown in FIG. 4, may further include: a plurality of pixels arranged in an array in the display region AA.

Each pixel may include a red sub pixel R, a green sub pixel G and a blue sub pixel B. The sub pixels in same color are disposed on the same column, and the sub pixels in three colors are arrayed periodically in a row direction.

The test signal terminal includes three sub test signal terminals (such as DataR, DataG and DataB), and each sub test signal terminal is correspondingly coupled with one second selection circuit 102.

Each second selection circuit 102 includes n second selection transistors (such as T51, T52, T53, T54, T55 and T56) and n second anticreeping transistors (such as T61, T62, T63, T64, T65 and T66), wherein n is the quantity of columns of the sub pixels with the same color.

Gate electrodes of the second selection transistors (such as T51, T52, T53, T54, T55 and T56) are coupled with the third control signal terminal S1, first electrodes of the second selection transistors (such as T51, T52, T53, T54, T55 and T56) are coupled with second electrodes of the second anticreeping transistors (such as T61, T62, T63, T64, T65 and T66), second electrodes of the second selection transistors (such as T51, T52, T53, T54, T55 and T56) are coupled with one column of sub pixels, and all the columns of sub pixels coupled to the same second selection circuit 102 are the same in color.

Gate electrodes of the second anticreeping transistors (such as T61, T62, T63, T64, T65 and T66) are coupled with the fourth control signal terminal S2, and first electrodes of the second anticreeping transistors (such as T61, T62, T63, T64, T65 and T66) are coupled with the corresponding sub test signal terminals (such as DataR, DataG and DataB).

During specific implementation, the third control signal terminal S1 controls the second selection transistors (such as T51, T52, T53, T54, T55 and T56) to be turned off, the second anticreeping transistors (such as T61, T62, T63, T64, T65 and T66) are turned off under control of the fourth control signal terminal S2, so that the sub data signal terminals (such as Data1, Data2 and Data3) and the second selection transistors (such as T51, T52, T53, T54, T55 and T56) are disconnected, thereby preventing electric leakage of the second selection transistors (such as T51, T52, T53, T54, T55 and T56). Because the second anticreeping transistors (such as T61 and T63) are in the turn-off state, all the second selection transistors (such as T51 and T53) electrically connected with the same sub test signal terminal (such as DataR) cannot be conducted, it is thus ensured that signals of all the second selection transistors (such as T51 and T53) are not mutually pulled, thereby ensuring normal display.

It should be noted that the above only illustrates the specific structure of the second selection circuits provided by the embodiment of the disclosure. During specific implementation, the specific structure of the second selection circuits is not limited to the above structure provided by the embodiment of the disclosure, and may further be other structures known by those skilled in the art, which is not limited here.

In some embodiments, in the above array substrate provided by the embodiment of the disclosure, a channel width-to-length ratio of the second selection transistors (such as T51, T52, T53, T54, T55 and T56) may be equal to a channel width-to-length ratio of the second anticreeping transistors (such as T61, T62, T63, T64, T65 and T66). In this way, the same technological parameters may be adopted to manufacture the second selection transistors and the second anticreeping transistors, and a manufacturing technology is simplified. On the other hand, the same channel width-to-length ratio may ensure that during the cell test stage, a current flowing through the second selection transistors (such as T51, T52, T53, T54, T55 and T56) and a current flowing through the second anticreeping transistors (such as T61, T62, T63, T64, T65 and T66) are the same in magnitude, thereby ensuring the stability of the current magnitude on a path from the test signal terminal (such as DataR, DataG and DataB) to the sub pixels, so that existence of the second anticreeping transistors (such as T61, T62, T63, T64, T65 and T66) does not influence a charging process of the sub pixels.

In some embodiments, the first selection transistors, the first anticreeping transistors, the second selection transistors and the second anticreeping transistors are the same in channel width-to-length ratio. In this way, the above transistors may be manufactured by adopting the same technological parameters, and the manufacturing technology is further simplified.

In some embodiments, in the above array substrate provided by the embodiment of the disclosure, the second selection transistors (such as T51, T52, T53, T54, T55 and T56) and the second anticreeping transistors (such as T61, T62, T63, T64, T65 and T66) may be N-type low-temperature polycrystalline silicon transistors.

When the second selection transistors (such as T51, T52, T53, T54, T55 and T56) are turned off, a difference between the voltage of the first turn-off signal provided by the third control signal terminal S1 and a voltage of the third turn-on signal provided by the test signal terminal (such as DataR, DataG and DataB) is greater than 3 V, and a difference between the voltage of the second turn-off signal provided by the fourth control signal terminal S2 and the voltage of the third turn-on signal is greater than 0 V and smaller than or equal to 3 V.

In the disclosure, when Vgs of the N-type low-temperature polycrystalline silicon transistors is smaller than 0 V, and an absolute value of Vgs is greater than a threshold voltage $V_{th}$ of the N-type low-temperature polycrystalline silicon transistors, the N-type low-temperature polycrystalline silicon transistors are in a turn-on state; when Vgs>0V, the N-type low-temperature polycrystalline silicon transistors are in a turn-off state of a cutoff region; when 0V<Vgs<3V, a leakage current is small and may be ignored; when Vgs>3V, a large leakage current is generated, resulting in that the transistors cannot be turned off normally. Therefore, when the difference between the voltage (that is, the gate voltage of the second anticreeping transistors) of the fourth control signal terminal S2 and the voltage (that is, the source voltage of the second anticreeping transistors) of the test signal terminal (such as DataR, DataG and DataB) is greater than 0 V and smaller than or equal to 3 V, it may be ensured that the second anticreeping transistors are turned off, and electric connection between the second selection transistors and the test signal terminal is broken. In this case, even if the difference between the voltage (that is, the gate voltage of the second selection transistors) of the third control signal terminal S1 and the voltage of the test signal terminal (such as DataR, DataG and DataB) is greater than 3 V, abnormal display caused by mutual influencing of the signals of all the second selection transistors may also be avoided due to existence of the second anticreeping transistors. In this process, the voltage of the test signal terminal (such as DataR, DataG and DataB) is determined by the leakage current possibly generated by the second selection transistors.

In addition, because the selection circuit for cell test is in the turned-off state in the using process of the terminal product, a drive chip (such as FPC) in the array substrate may further be adopted to provide signals for the selection circuit for cell test, so as to ensure that an unfavorable condition of electric leakage will not happen to all the selection transistors in the selection circuit for cell test.

Figure 5:
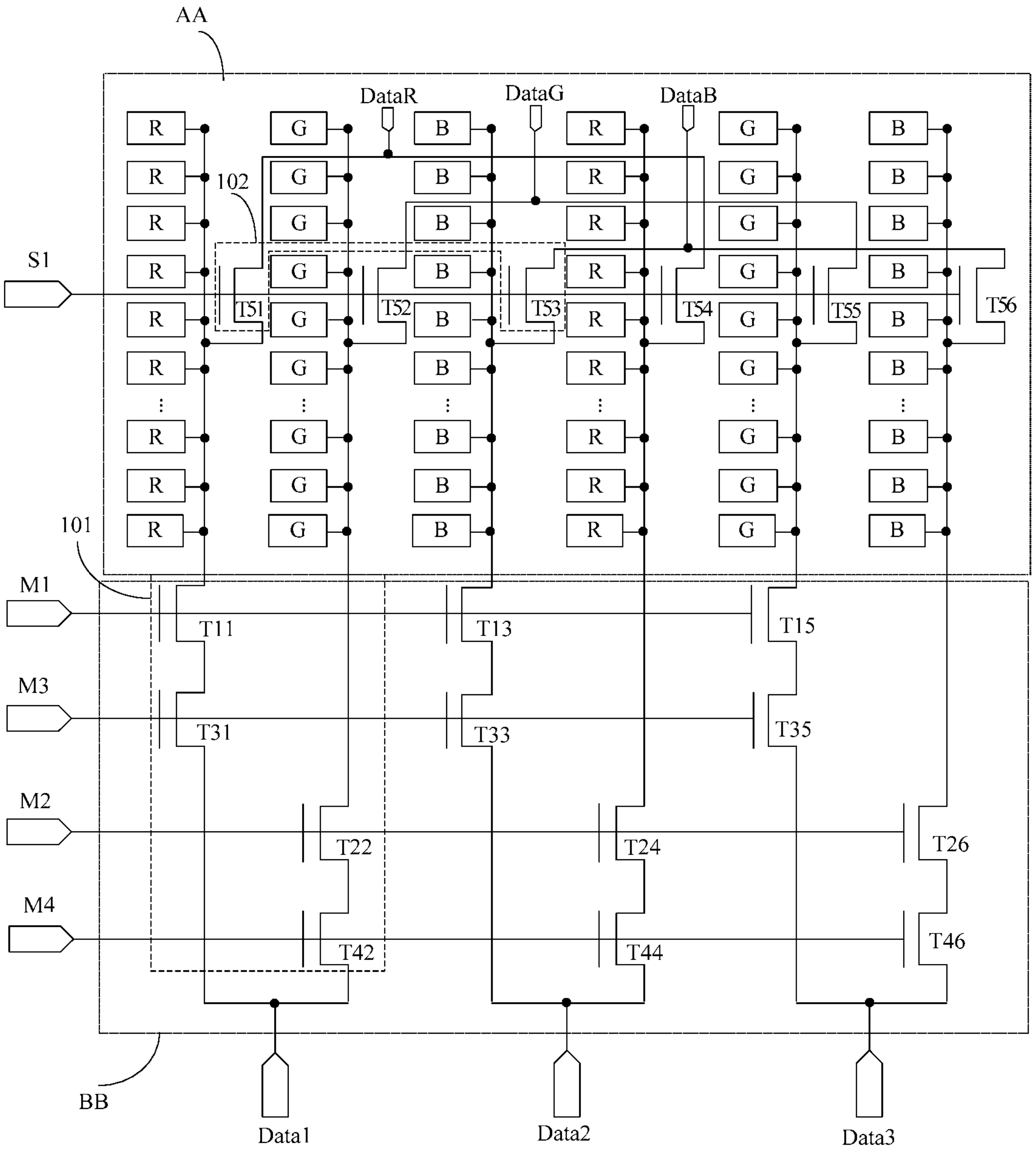
FIG. 5 is another schematic structural diagram of an array substrate according to some embodiments of the disclosure.

In some embodiments, the above array substrate provided by the embodiment of the disclosure, as shown in FIG. 5, may further include: a plurality of second selection circuits 102 located in the display region AA, and each second selection circuit 102 may include at least two second selection transistors (such as T51, T52, T53, T54, T55 and T56).

The second selection transistors (such as T51, T52, T53, T54, T55 and T56) are configured to be turned off under control of the first turn-off signal provided by the third control signal terminal S1 and the third turn-off signal provided by a drive chip (such as FPC), so that the test signal terminal (such as DataR, DataG and DataB) and the sub pixels are disconnected.

During specific implementation, signals may be provided for the test signal terminal (such as DataR, DataG and DataB) by the drive chip, so that a difference Vgs of a gate voltage and a source voltage of the second selection transistors (such as T51, T52, T53, T54, T55 and T56) is small, so as to ensure that the second selection transistors (such as T51, T52, T53, T54, T55 and T56) are in a normal turn-off state and do not cause abnormal display.

In some embodiments, in the above array substrate provided by the embodiment of the disclosure, as shown in FIG. 5, each pixel may include a red sub pixel R, a green sub pixel G and a blue sub pixel B. The sub pixels in same color are disposed on the same column, and the sub pixels in three colors are arrayed periodically in a row direction.

The test signal terminal includes three sub test signal terminals (such as DataR, DataG and DataB), and each sub test signal terminal is correspondingly coupled with one second selection circuit 102.

Each second selection circuit 102 includes n second selection transistors (such as T51, T52, T53, T54, T55 and T56) and n second anticreeping transistors (such as T61, T62, T63, T64, T65 and T66), wherein n is the quantity of columns of the sub pixels with the same color.

Gate electrodes of the second selection transistors (such as T51, T52, T53, T54, T55 and T56) are coupled with the third control signal terminal S1, first electrodes of the second selection transistors (such as T51, T52, T53, T54, T55 and T56) are coupled with the corresponding sub test signal terminals (such as DataR, DataG and DataB), second electrodes of the second selection transistors (such as T51, T52, T53, T54, T55 and T56) are coupled with one column of sub pixels, and all the columns of sub pixels coupled to the same second selection circuit are the same in color.

During specific implementation, the third control signal terminal S1 and the drive chip control the second selection transistors (such as T51, T52, T53, T54, T55 and T56) to be turned off, electric leakage of the second selection transistors (such as T51, T52, T53, T54, T55 and T56) are effectively prevented, and it is ensured that the signals of the second selection transistors are not mutually pulled, thereby further ensuring normal display.

It should be noted that the above only illustrates the specific structure of the second selection circuits provided by the embodiment of the disclosure. During specific implementation, the specific structure of the second selection circuits is not limited to the above structure provided by the embodiment of the disclosure, and may further be other structures known by those skilled in the art, which is not limited here.

In some embodiments, in the above array substrate provided by the embodiment of the disclosure, the second selection circuits are N-type low-temperature polycrystalline silicon transistors, and the difference between the voltage of the first turn-off signal provided by the third control signal terminal and a voltage of a third turn-off signal provided for the test signal terminal by the drive chip is greater than 0 V and smaller than or equal to 3V.

In some embodiments, when Vgs of the above all second selection transistors T51, T52, T53, T54, T55 and T56 is smaller than 0V, the above all second selection transistors T51, T52, T53, T54, T55, T56 are in a turn-on state; when Vgs>0V, the above all second selection transistors T51, T52, T53, T54, T55 and T56 are in a turn-off state; when 0V<Vgs<3V, a leakage current is small and may be ignored; when Vgs>3V, a large leakage current is generated, resulting in that the transistors cannot be turned off normally. Therefore, the voltage (such as 10 V) may be provided for the test signal terminal (such as DataR, DataG and DataB) through the drive chip, so that the difference between the voltage (that is, the gate voltage of the second selection transistors, for example, 13 V) of the fourth control signal terminal S2 and the voltage (that is, the source voltage of the second selection transistors) of the test signal terminal (such as DataR, DataG and DataB) is greater than 0 V and smaller than or equal to 3 V (such as 3*v*), so as to ensure that the second selection transistors may be normally turned off.

In some embodiments, the third control signal terminal S1 may provide the voltage of −13 V for the gate electrodes of the second selection transistors at the cell test stage, and provide the 13 V voltage for the gate electrodes of the second selection transistors at a display stage; and the drive chip provides the voltage of 10 V to 13 V for source electrodes of the second selection transistors through the test signal terminal at the display stage. Certainly, during specific implementation, the voltage loaded to the gate electrodes and the source electrodes of the second selection transistors may be set according to the characteristics of the transistors in an actual product, it may only be ensured that the leakage current is in the small range (for example, smaller than or equal to $100*10^{-15}$ A), which is not specifically limited here.

It should be noted that the above is illustrated only by taking all the transistors being N-type low-temperature polycrystalline silicon transistors for example. In some embodiments, all the transistors may further be P-type low-temperature polycrystalline silicon transistors, N-type oxide transistors, P-type oxide transistors, N-type amorphous silicon transistors, P-type amorphous silicon transistors and the like. The above set mode of the anticreeping transistors may be adopted according to the characteristics and the drive voltage of the transistors so as to ensure that the selection transistors have no leakage current or the leakage current is in a small range.

Based on the same inventive concept, embodiments of the disclosure provide a driving method of the above array substrate. Principles of the driving method for solving the problems are similar to that of the above array substrate, therefore, implementation of the driving method provided by the embodiment of the disclosure may refer to that of the above array substrate provided by the embodiment of the disclosure, and repetitions are omitted.

The driving method of the above array substrate provided by the embodiments of the disclosure, includes the following steps.

Figure 6:
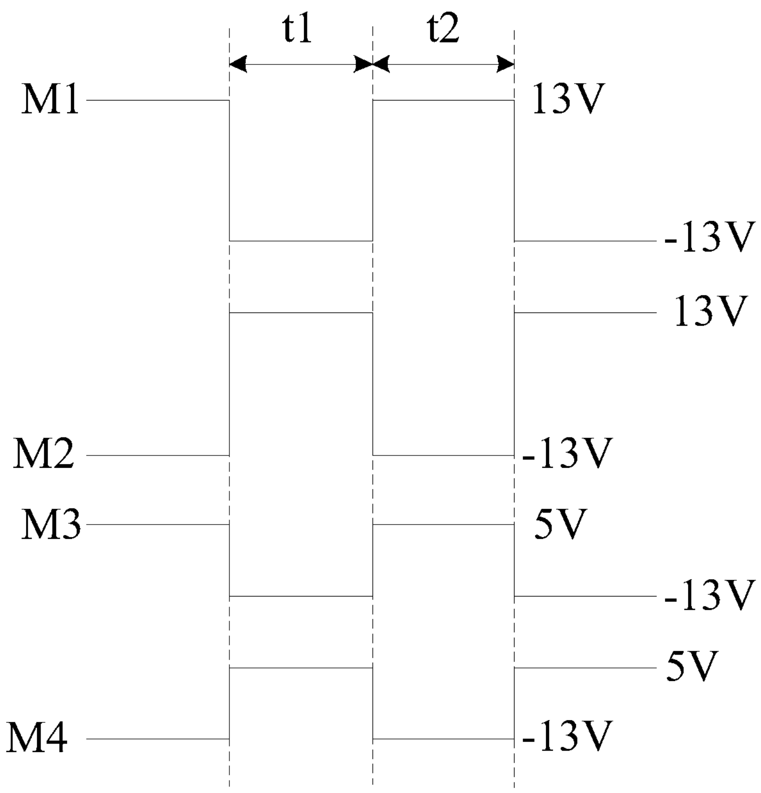
FIG. 6 is a timing diagram of a selection circuit in an array substrate shown in FIG. 2.

Each pair of first selection transistor and first anticreeping transistor disposed in series and included in a corresponding first selection circuit are turned on in a time-sharing mode:

as shown in FIG. 6, at a turn-on stage t1, the first selection transistors are turned on in response to a first turn-on signal provided by a first control signal terminal (such as M1 and M2), and the first anticreeping transistors are turned on in response to a second turn-on signal provided by a second control signal terminal (such as M3 and M4), to make a conducting path between a data signal terminal and the first selection transistors; and at a turn-off stage t2, the first selection transistors are in a turn-off state in response to a first turn-off signal provided by the first control signal terminal (such as M1 and M2), and the first anticreeping transistors are turned off in response to a second turn-off signal provided by the second control signal terminal (such as M3 and M4), to make the data signal terminal and the first selection transistors disconnected, so as to prevent electric leakage of the first selection transistors.

Figure 7:
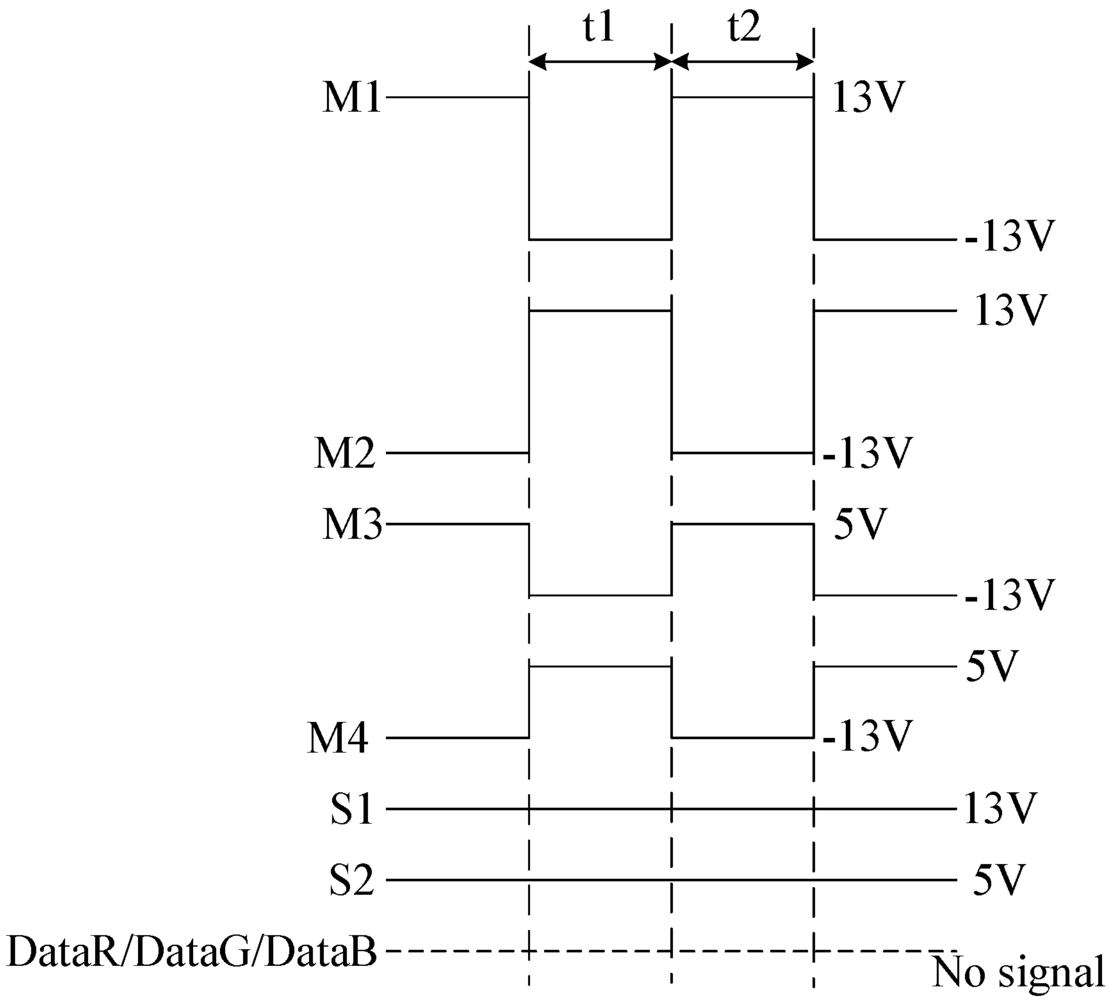
FIG. 7 is a timing diagram of a selection circuit in an array substrate shown in FIG. 4.

In some embodiments, in the above driving method provided by the embodiment of the disclosure, while each pair of first selection transistor and first anticreeping transistor disposed in series and included in a corresponding first selection circuit are turned on in a time-sharing mode, the following steps may further be executed:

as shown in FIG. 7, in a plurality of second selection circuits, all second selection transistors are in a turn-off state in response to a first turn-off signal provided by a third control signal terminal S1, and all second anticreeping transistors are turned off in response to a second turn-off signal provided by a fourth control signal terminal S2, to make all the second selection transistors included in the same second selection circuit disconnected.

Figure 8:
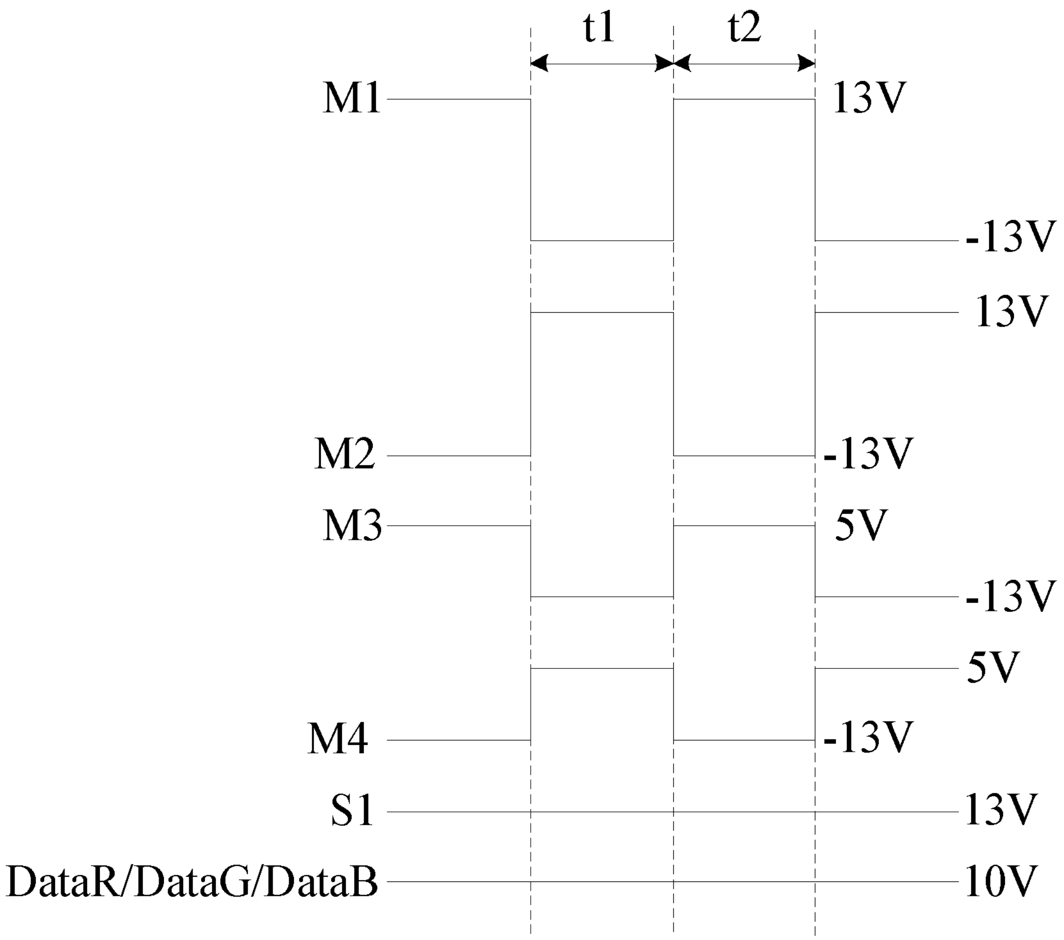
FIG. 8 is a timing diagram of a selection circuit in an array substrate shown in FIG. 5.

In some embodiments, in the above driving method provided by the embodiment of the disclosure, while each pair of first selection transistor and first anticreeping transistor disposed in series and included in a corresponding first selection circuit are turned on in a time-sharing mode, the following steps may further be executed:

as shown in FIG. 8, in a plurality of second selection circuits, all second selection transistors are turned off in response to a first turn-off signal provided by a third control signal terminal S3 and a third turn-off signal (equivalent to signals of DataR/DataG/DataB) provided by a drive chip, so as to avoid a leakage current of the second selection transistors.

Based on the same inventive concept, embodiments of the disclosure provide a display apparatus, including the above array substrate provided by the embodiment of the disclosure. Principles of the display apparatus for solving the problems are similar to that of the above array substrate, therefore, implementation of the display apparatus provided by the embodiment of the disclosure may refer to that of the above array substrate provided by the embodiment of the disclosure, and repetitions are omitted.

In some embodiments, the above display apparatus provided by the embodiment of the disclosure may be any product or component with a display function, such as a mobile phone, a tablet computer, a television, a display, a notebook computer, a digital photo frame, a navigator, a smart watch, a fitness wristband and a personal digital assistant. The display apparatus provided by the embodiment of the disclosure may further include but is not limited to: a radio frequency unit, a network module, an audio output unit, an input unit, a sensor, a display unit, a user input unit, an interface unit, a memory, a processor, a power supply and other components. Those skilled in the art may understand that composition of the above display apparatus does not form limitation to the display apparatus, and the display apparatus may include more or less above components, or combine certain components, or different component arrangement.

Obviously, those skilled in the art can make various modifications and variations to the disclosure without departing from the spirit and scope of the disclosure. In this way, if these modifications and variations of the disclosure fall within the scope of the claims of the disclosure and their equivalent art, the disclosure also intends to include these modifications and variations.

The invention claimed is:

1. An array substrate, comprising:

a plurality of first selection circuits, wherein each first selection circuit comprises at least two first selection transistors and at least two first anticreeping transistors, and each first selection transistor is correspondingly connected with one first anticreeping transistor of the at least two first anticreeping transistors in series; and for each first selection transistor and the one first anticreeping transistor correspondingly connected in series in each first selection circuit:

when a first selection transistor is turned on under control of a first turn-on signal provided by a first control signal terminal, a corresponding first anticreeping transistor is turned on under control of a second turn-on signal provided by a second control signal terminal to form a conducting path between a data signal terminal and a corresponding first selection transistor; and when a first selection transistor is turned off under control of a first turn-off signal provided by the first control signal terminal, a corresponding first anticreeping transistor is turned off under control of a second turn-off signal provided by the second control signal terminal to make a corresponding first selection transistor and the data signal terminal disconnected, wherein a voltage of the first turn-off signal is greater than a voltage of the second turn-off signal;

wherein the array substrate further comprises a plurality of sub pixels arranged in an array, wherein the first control signal terminal comprises a first sub signal terminal and a second sub signal terminal, and the second control signal terminal comprises a third sub signal terminal and a fourth sub signal terminal; wherein the first sub signal terminal, the second sub signal terminal, the third sub signal terminal and the fourth sub signal terminal are different signal terminals for independently providing different timing signals each oscillating between a high and low state;

the data signal terminal comprises a plurality of sub data signal terminals, and each sub data signal terminal is correspondingly coupled with one first selection circuit of the plurality of first selection circuits;

each first selection circuit comprises: a first transistor, a second transistor, a third transistor and a fourth transistor, wherein the first transistor and the second transistor are first selection transistors, and the third transistor and the fourth transistor are first anticreeping transistors;

a gate electrode of the first transistor is coupled with the first sub signal terminal, a first electrode of the first transistor is coupled with a second electrode of the third transistor, and a second electrode of the first transistor is coupled with an odd-number column of sub pixels;

a gate electrode of the third transistor is coupled with the third sub signal terminal, and a first electrode of the third transistor is coupled with a corresponding sub data signal terminal;

a gate electrode of the second transistor is coupled with the second sub signal terminal, a first electrode of the second transistor is coupled with a second electrode of the fourth transistor, and a second electrode of the second transistor is coupled with an even-number column of sub pixels; and a gate electrode of the fourth transistor is coupled with the fourth sub signal terminal, and a first electrode of the fourth transistor is coupled with the corresponding sub data signal terminal.

2. The array substrate according to claim 1, wherein a channel width-to-length ratio of each first selection transistor is equal to a channel width-to-length ratio of each first anticreeping transistor.

3. The array substrate according to claim 2, wherein each first selection transistor and each first anticreeping transistor are N-type low-temperature polycrystalline silicon transistors; and when a first selection transistor is turned off, a difference between the voltage of the first turn-off signal and a voltage of a data signal provided by the data signal terminal is greater than 3 V, and a difference between the voltage of the second turn-off signal and the voltage of the data signal is greater than 0 V and smaller than or equal to 3 V.

4. The array substrate according to claim 1, further comprising: a plurality of second selection circuits in a display region of the array substrate;

wherein each of the plurality of second selection circuits comprises at least two second selection transistors, and each of the at least two second selection transistors is connected with a third control signal terminal.

5. The array substrate according to claim 4, wherein each second selection circuit further comprises at least two second anticreeping transistors, and each second selection transistor is correspondingly connected with one second anticreeping transistor of the at least two second anticreeping transistors in series;

for each second selection transistor and the one second anticreeping transistor correspondingly connected in series:

when a second selection transistor is turned off under control of the first turn-off signal provided by a third control signal terminal, a corresponding second anti-creeping transistor is turned off to make the second selection transistor and a test signal terminal disconnected under control of the second turn-off signal provided by a fourth control signal terminal.

6. The array substrate according to claim 5, further comprising: a plurality of pixels arranged in an array in the display region, wherein each pixel comprises sub pixels in three colors, sub pixels in a same column are in same color, and the sub pixels in three colors are arranged periodically in a row direction;

the test signal terminal comprises three sub test signal terminals, and each sub test signal terminal is correspondingly coupled with one second selection circuit;

each second selection circuit comprises n second selection transistors and n second anticreeping transistors, wherein n is a quantity of columns of the sub pixels in same color; wherein a gate electrode of each second selection transistor is coupled with the third control signal terminal, a first electrode of a second selection transistor is coupled with a second electrode of a corresponding second anticreeping transistor, a second electrode of the second selection transistor is coupled with a column of sub pixels, and all columns of sub pixels coupled to a same second selection circuit are same in color; and a gate electrode of each corresponding second anticreeping transistor is coupled with the fourth control signal terminal, and a first electrode of the corresponding second anticreeping transistor is coupled with a corresponding sub test signal terminal.

7. The array substrate according to claim 6, wherein a channel width-to-length ratio of each second selection transistor is equal to a channel width-to-length ratio of each second anticreeping transistor.

8. The array substrate according to claim 7, wherein each second selection transistor and each second anticreeping transistor are N-type low-temperature polycrystalline silicon transistors; and when a second selection transistor is turned off, a difference between the voltage of the first turn-off signal and a voltage of a third turn-on signal provided by the test signal terminal is greater than 3 V, and a difference between the voltage of the second turn-off signal and the voltage of the third turn-on signal is greater than 0 V and smaller than or equal to 3 V.

9. The array substrate according to claim 4, wherein the at least two second selection transistors are configured to be turned off under control of the first turn-off signal provided by a third control signal terminal and a third turn-off signal provided by a drive chip.

10. The array substrate according to claim 9, further comprising: a plurality of pixels arranged in an array in the display region, wherein each pixel comprises sub pixels in three colors, sub pixels in a same column are in same color, and the sub pixels in three colors are arranged periodically in a row direction;

a second selection circuit is correspondingly coupled to a sub test signal terminal of three sub test signal terminals comprised in a test signal terminal;

each second selection circuit comprises n second selection transistors, wherein n is a quantity of columns of the sub pixels in the same color; and a gate electrode of each second selection transistor is coupled with the third control signal terminal, a first electrode of a second selection transistor is coupled with a corresponding sub test signal terminal, a second electrode of the second selection transistor is coupled with a column of sub pixels, and all columns of sub pixels coupled to a same second selection circuit are same in color.

11. The array substrate according to claim 10, wherein each second selection transistor is a N-type low-temperature polycrystalline silicon transistor, and a difference between the voltage of the first turn-off signal and a voltage of the third turn-off signal is greater than 0 V and smaller than or equal to 3 V.

12. A driving method of the array substrate according to claim 1, comprising:

turning on, in a time-sharing mode, each pair of first selection transistor and first anticreeping transistor connected in series and included in each first selection circuit, wherein at a turn-on stage, a first selection transistor is turned on in response to the first turn-on signal provided by the first control signal terminal, and a corresponding first anticreeping transistor is turned on in response to the second turn-on signal provided by the second control signal terminal, to make a conducting path between the data signal terminal and the first selection transistor; and at a turn-off stage, a first selection transistor is in a turn-off state in response to the first turn-off signal provided by the first control signal terminal, and a corresponding first anticreeping transistor is turned off in response to the second turn-off signal provided by the second control signal terminal, to make the data signal terminal and the first selection transistor disconnected.

13. The driving method according to claim 12, wherein while each pair of first selection transistor and first anti-creeping transistor connected in series and included in each first selection circuit are turned on in the time-sharing mode, the driving method further comprises:

in a plurality of second selection circuits comprising second selection transistors and second anticreeping transistors, making all second selection transistors be in a turn-off state in response to the first turn-off signal provided by a third control signal terminal, and making all second anticreeping transistors be turned off in response to the second turn-off signal provided by a fourth control signal terminal, to make all the second selection transistors included in a second selection circuit disconnected.

14. The driving method according to claim 12, wherein while each pair of first selection transistor and first anti-creeping transistor connected in series and included in each first selection circuit are turned on in the time-sharing mode, the driving method further comprises:

in a plurality of second selection circuits comprising second selection transistors, making all second selection transistors be turned off in response to the first turn-off signal provided by a third control signal terminal and a third turn-off signal provided by a drive chip.

15. A display apparatus, comprising an array substrate, wherein the array substrate comprises:

a plurality of first selection circuits, wherein each first selection circuit comprises at least two first selection transistors and at least two first anticreeping transistors, and each first selection transistor is correspondingly connected with one first anticreeping transistor of the at least two first anticreeping transistors in series; and for each first selection transistor and the one first anticreeping transistor correspondingly connected in series in each first selection circuit:

when a first selection transistor is turned on under control of a first turn-on signal provided by a first control signal terminal, a corresponding first anticreeping transistor is turned on under control of a second turn-on signal provided by a second control signal terminal to form a conducting path between a data signal terminal and a corresponding first selection transistor; and when a first selection transistor is turned off under control of a first turn-off signal provided by the first control signal terminal, a corresponding first anticreeping transistor is turned off under control of a second turn-off signal provided by the second control signal terminal to make a corresponding first selection transistor and the data signal terminal disconnected, wherein a voltage of the first turn-off signal is greater than a voltage of the second turn-off signal;

the first control signal terminal comprises a first sub signal terminal and a second sub signal terminal, and the second control signal terminal comprises a third sub signal terminal and a fourth sub signal terminal; wherein the first sub signal terminal, the second sub signal terminal, the third sub signal terminal and the fourth sub signal terminal are different signal terminals for independently providing different timing signals each oscillating between a high and low state;

the data signal terminal comprises a plurality of sub data signal terminals, and each sub data signal terminal is correspondingly coupled with one first selection circuit of the plurality of first selection circuits;

each first selection circuit comprises: a first transistor, a second transistor, a third transistor and a fourth transistor, wherein the first transistor and the second transistor are first selection transistors, and the third transistor and the fourth transistor are first anticreeping transistors;

a gate electrode of the first transistor is coupled with the first sub signal terminal, a first electrode of the first transistor is coupled with a second electrode of the third transistor, and a second electrode of the first transistor is coupled with an odd-number column of sub pixels;

a gate electrode of the third transistor is coupled with the third sub signal terminal, and a first electrode of the third transistor is coupled with a corresponding sub data signal terminal;

a gate electrode of the second transistor is coupled with the second sub signal terminal, a first electrode of the second transistor is coupled with a second electrode of the fourth transistor, and a second electrode of the second transistor is coupled with an even-number column of sub pixels; and a gate electrode of the fourth transistor is coupled with the fourth sub signal terminal, and a first electrode of the fourth transistor is coupled with the corresponding sub data signal terminal.

16. The display apparatus according to claim 15, wherein the array substrate further comprises: a plurality of second selection circuits in a display region of the array substrate;

wherein each of the plurality of second selection circuits comprises at least two second selection transistors, and each of the at least two second selection transistors is connected with a third control signal terminal.

17. The array substrate according to claim 16, wherein each second selection circuit further comprises at least two second anticreeping transistors, and each second selection transistor is correspondingly connected with one second anticreeping transistor of the at least two second anticreeping transistors in series;

for each second selection transistor and the one second anticreeping transistor correspondingly connected in series:

when a second selection transistor is turned off under control of the first turn-off signal provided by a third control signal terminal, a corresponding second anticreeping transistor is turned off under control of the second turn-off signal provided by a fourth control signal terminal to make the second selection transistor and a test signal terminal disconnected.

18. The display apparatus according to claim 16, wherein the at least two second selection transistors are configured to be turned off under control of the first turn-off signal provided by a third control signal terminal and a third turn-off signal provided by a drive chip.

* * * * *